United States Patent
Turgut et al.

(10) Patent No.: US 10,595,054 B2
(45) Date of Patent: Mar. 17, 2020

(54) METHOD AND APPARATUS FOR A VIRTUAL ONLINE VIDEO CHANNEL

(71) Applicant: Google Inc., Mountain View, CA (US)

(72) Inventors: Alper Turgut, San Francisco, CA (US); Oztan Harmanci, Mountain View, CA (US); Ismail R. Haritaoglu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/590,996

(22) Filed: May 9, 2017

(65) Prior Publication Data

US 2017/0332114 A1 Nov. 16, 2017

Related U.S. Application Data

(60) Provisional application No. 62/334,236, filed on May 10, 2016.

(51) Int. Cl.
*H04N 21/234* (2011.01)
*H04N 21/262* (2011.01)
(Continued)

(52) U.S. Cl.
CPC ... *H04N 21/23424* (2013.01); *H04L 65/1069* (2013.01); *H04L 65/607* (2013.01);
(Continued)

(58) Field of Classification Search
CPC ......... H04N 21/23424; H04N 21/2187; H04N 21/482; H04N 21/812; H04N 21/262;
(Continued)

(56) References Cited

U.S. PATENT DOCUMENTS 5,513,260 A  4/1996  Ryan
5,577,135 A  11/1996  Grajski et al.
(Continued)

FOREIGN PATENT DOCUMENTS

WO  2006122320 A2  11/2006
WO  2007148290 A2  12/2007

OTHER PUBLICATIONS

International Search Report for PCT Patent Application No. PCT/US2017/032015 dated Aug. 4, 2017, 11 pages.
(Continued)

*Primary Examiner* — John R Schnurr
(74) *Attorney, Agent, or Firm* — Lowenstein Sandler LLP (57) ABSTRACT

An apparatus and method for providing a virtual online live video channel is disclosed. The virtual video channel is generated without requiring a dedicated content provider and encoder for the channel. A schedule server stores a schedule for the virtual online live video channel, and the schedule may include one or more of live streaming video content, stored video content, and advertising. A video player establishes communication with a manifest server and requests playback of the video channel. The manifest server generates a per-user manifest file corresponding to the schedule of the video channel and delivers the per-user manifest file to the video player. The video player may then retrieve the desired video content from the content delivery network to produce the virtual online video channel.

18 Claims, 5 Drawing Sheets

(51) Int. Cl.
    *H04N 21/2668* (2011.01)
    *H04N 21/2665* (2011.01)
    *H04N 21/84* (2011.01)
    *H04N 21/6332* (2011.01)
    *H04L 29/06* (2006.01)
    *H04N 21/2187* (2011.01)
    *H04N 21/482* (2011.01)
    *H04N 21/81* (2011.01)

(52) U.S. Cl.
    CPC ....... *H04N 21/2187* (2013.01); *H04N 21/262* (2013.01); *H04N 21/2665* (2013.01); *H04N 21/2668* (2013.01); *H04N 21/482* (2013.01); *H04N 21/6332* (2013.01); *H04N 21/812* (2013.01); *H04N 21/84* (2013.01)

(58) Field of Classification Search
    CPC ........... H04N 21/2665; H04N 21/2668; H04N 21/6332; H04N 21/84; H04L 65/1069; H04L 65/607
    See application file for complete search history.

(56) References Cited

U.S. PATENT DOCUMENTS

| | | | |
|---|---|---|---|
| 5,659,613 | A | 8/1997 | Copeland et al. |
| 5,668,603 | A | 9/1997 | Copeland |
| 5,721,788 | A | 2/1998 | Powell et al. |
| 5,883,959 | A | 3/1999 | Kori |
| 5,917,943 | A | 6/1999 | Washizawa |
| 6,018,374 | A | 1/2000 | Wrobleski |
| 6,026,189 | A | 2/2000 | Greenspan |
| 6,173,275 | B1 | 1/2001 | Caid et al. |
| 6,373,960 | B1 | 4/2002 | Conover et al. |
| 6,381,367 | B1 | 4/2002 | Ryan |
| 6,404,925 | B1 | 6/2002 | Foote et al. |
| 6,438,275 | B1 | 8/2002 | Martins et al. |
| 6,539,395 | B1 | 3/2003 | Gjerdingen et al. |
| 6,711,293 | B1 | 3/2004 | Lowe |
| 6,774,917 | B1 | 8/2004 | Foote et al. |
| 6,785,815 | B1 | 8/2004 | Serret-Avila et al. |
| 6,937,766 | B1 | 8/2005 | Wilf et al. |
| 6,975,746 | B2 | 12/2005 | Davis et al. |
| 6,975,755 | B1 | 12/2005 | Baumberg |
| 7,043,019 | B2 | 5/2006 | Tehranchi et al. |
| 7,055,169 | B2 | 5/2006 | Delpuch et al. |
| 7,167,574 | B2 | 1/2007 | Kim |
| 7,177,470 | B2 | 2/2007 | Jasinschi et al. |
| 7,185,201 | B2 | 2/2007 | Rhoads et al. |
| 7,218,754 | B2 | 5/2007 | Schumann et al. |
| 7,272,240 | B2 | 9/2007 | Goldberg et al. |
| 7,298,930 | B1 | 11/2007 | Erol et al. |
| 7,325,013 | B2 | 1/2008 | Caruso |
| 7,421,376 | B1 | 9/2008 | Caruso et al. |
| 8,160,366 | B2 | 4/2012 | Nakamura et al. |
| 8,200,021 | B2 | 6/2012 | Iwamoto et al. |
| 8,515,212 | B1 | 8/2013 | Bengio et al. |
| 8,515,241 | B2 | 8/2013 | Forsyth et al. |
| 8,607,283 | B2 | 12/2013 | Civanlar et al. |
| 8,677,428 | B2 | 3/2014 | Lewis et al. |
| 8,887,215 | B2 | 11/2014 | Fisher |
| 8,943,215 | B2 | 1/2015 | Patten et al. |
| 9,015,151 | B1 | 4/2015 | Margulis et al. |
| 9,066,115 | B1 | 6/2015 | Cherry et al. |
| 9,066,138 | B1* | 6/2015 | Kraiman ............ H04N 21/458 |
| 9,167,278 | B2 | 10/2015 | Sinha et al. |
| 9,613,042 | B1 | 4/2017 | Joseph et al. |
| 10,148,716 | B1 | 12/2018 | Joseph et al. |
| 2002/0159641 | A1 | 10/2002 | Whitney et al. |
| 2003/0005454 | A1 | 1/2003 | Rodriguez et al. |
| 2003/0033347 | A1 | 2/2003 | Bolle et al. |
| 2003/0045954 | A1 | 3/2003 | Weare et al. |
| 2003/0195883 | A1 | 10/2003 | Mojsilovic et al. |
| 2004/0022447 | A1 | 2/2004 | Mukhopadhyay et al. |
| 2004/0085339 | A1 | 5/2004 | Divakaran et al. |
| 2004/0221237 | A1 | 11/2004 | Foote et al. |
| 2004/0260786 | A1 | 12/2004 | Barile |
| 2005/0125368 | A1 | 6/2005 | Akahori |
| 2005/0251532 | A1 | 11/2005 | Radhakrishnan et al. |
| 2005/0262245 | A1 | 11/2005 | Menon et al. |
| 2005/0289347 | A1 | 12/2005 | Ovadia |
| 2006/0029253 | A1 | 2/2006 | Pace |
| 2006/0101060 | A1 | 5/2006 | Li et al. |
| 2006/0111801 | A1 | 5/2006 | Weare et al. |
| 2006/0291690 | A1 | 12/2006 | Roberts |
| 2007/0025606 | A1 | 2/2007 | Gholap et al. |
| 2007/0157231 | A1 | 7/2007 | Eldering et al. |
| 2007/0217676 | A1 | 9/2007 | Grauman et al. |
| 2007/0253594 | A1 | 11/2007 | Lu et al. |
| 2007/0282898 | A1 | 12/2007 | Stark et al. |
| 2008/0027931 | A1 | 1/2008 | Lu et al. |
| 2008/0040807 | A1 | 2/2008 | Lu et al. |
| 2008/0123976 | A1 | 5/2008 | Coombs et al. |
| 2008/0166057 | A1 | 7/2008 | Nakajima |
| 2008/0186413 | A1 | 8/2008 | Someya et al. |
| 2008/0271080 | A1 | 10/2008 | Gossweiler et al. |
| 2009/0074235 | A1 | 3/2009 | Lahr et al. |
| 2009/0193473 | A1 | 7/2009 | Moon et al. |
| 2009/0204901 | A1 | 8/2009 | Dharmaji et al. |
| 2009/0324026 | A1 | 12/2009 | Kletter |
| 2010/0162330 | A1 | 6/2010 | Herlein et al. |
| 2011/0219035 | A1 | 9/2011 | Korsunsky et al. |
| 2011/0314493 | A1 | 12/2011 | Lemire et al. |
| 2012/0216121 | A1 | 8/2012 | Lin et al. |
| 2012/0240176 | A1 | 9/2012 | Ma et al. |
| 2012/0275597 | A1 | 11/2012 | Knox et al. |
| 2013/0163758 | A1 | 6/2013 | Swaminathan et al. |
| 2013/0195204 | A1 | 8/2013 | Reznik et al. |
| 2013/0291002 | A1 | 10/2013 | Rothschild et al. |
| 2013/0311780 | A1 | 11/2013 | Besehanic |
| 2014/0095890 | A1 | 4/2014 | Mangalore et al. |
| 2014/0115060 | A1 | 4/2014 | Kim et al. |
| 2014/0201334 | A1 | 7/2014 | Wang et al. |
| 2014/0259051 | A1 | 9/2014 | Strein et al. |
| 2014/0280781 | A1 | 9/2014 | Gregotski |
| 2015/0113021 | A1 | 4/2015 | Martin |
| 2015/0172342 | A1 | 6/2015 | Yin |
| 2015/0208103 | A1 | 7/2015 | Guntur et al. |
| 2015/0346832 | A1 | 12/2015 | Cole et al. |
| 2015/0365622 | A1 | 12/2015 | Ushiyama |
| 2015/0365725 | A1 | 12/2015 | Belyaev et al. |
| 2015/0382042 | A1 | 12/2015 | Wagenaar et al. |
| 2016/0065946 | A1 | 3/2016 | Cole et al. |
| 2016/0080470 | A1 | 3/2016 | Shanson |
| 2016/0080810 | A1 | 3/2016 | Dutta et al. |
| 2016/0127260 | A1* | 5/2016 | Gordon ................ H04L 47/783 709/226 |
| 2016/0127440 | A1 | 5/2016 | Gordon |
| 2016/0149699 | A1 | 5/2016 | Gauda |
| 2016/0173961 | A1 | 6/2016 | Coan et al. |
| 2016/0198202 | A1 | 7/2016 | Van Brandenburg et al. |
| 2016/0224799 | A1* | 8/2016 | Uzun ................. G06F 21/6227 |
| 2016/0227279 | A1* | 8/2016 | Fang ................. H04N 21/4532 |
| 2016/0337704 | A1* | 11/2016 | Binder ............... H04N 21/4826 |
| 2017/0064400 | A1* | 3/2017 | Riegel .............. H04N 21/47202 |
| 2017/0085933 | A1 | 3/2017 | Czeck, Jr. et al. |
| 2017/0150190 | A1 | 5/2017 | Tarbox et al. |
| 2017/0280181 | A1* | 9/2017 | Ramaley ............ H04L 65/4084 |
| 2017/0302753 | A1 | 10/2017 | Larumbe et al. |
| 2017/0308681 | A1* | 10/2017 | Gould .................... G06F 21/10 |
| 2017/0353516 | A1 | 12/2017 | Gordon |
| 2018/0063594 | A1 | 3/2018 | Alexander et al. |

OTHER PUBLICATIONS

D. G. Lowe, "Object Recognition from Local Scale-Invariant Features", in International Conference on Computer Vision, vol. 2, 1999, pp. 1-8.

K. Mihcak and R. Venkatesan, "Blind Image Watermarking via Derivation and Quantization of Robust Semi-Global Statistics", in IEEE International Conference on Acoustics, Speech and Signal Processing, 2002, (4 pages).

(56) References Cited

OTHER PUBLICATIONS

A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

T. Lindeberg, "Feature Detection with Automatic Scale Selection", International Journal of Computer Vision, vol. 30, No. 2, 1998, pp. 1-51.

\* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 3

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDIJ6Q==?anvack=nbcu_n
bcd_watchvod_ios_qa_c23d2809ee27249f2a757537da68d17d",IV=0xE0F48617C65F9D00ACC4B47D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDIJ6Q==?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

METHOD AND APPARATUS FOR A VIRTUAL ONLINE VIDEO CHANNEL

CROSS-REFERENCE TO RELATED APPLICATIONS

This application claims priority to U.S. provisional application Ser. No. 62/334,236, filed May 10, 2016 and titled Method and Apparatus for a Virtual Online Video Channel, the entire contents of which is incorporated herein by reference.

BACKGROUND

The subject matter disclosed herein relates to a method of providing a virtual linear video channel for streaming video. More specifically, a method and apparatus for providing multiple streaming linear video channels from existing video channels and previously recorded video is disclosed.

Video streaming allows video content to be delivered to a video player via the internet. The video content is a video signal generated by a content provided for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

As is further known to those skilled in the art, broadcast operators of live streaming video channels typically utilize a content provider such as an automation playout system that transmits the video signal, and an encoder for each live streaming video channel. The cost of the equipment for providing a single live streaming video channel is significant.

However, the demand for new channels and varied content is rapidly growing. Viewers expect channels with video lineups tailored to their preferences. Further, the library of stored content continues to grow, such that some viewers opt for on-demand services only rather than live streaming content. Although the viewer may need to wait for a time period before the newest content is available via an on-demand service, the viewer elects to wait rather than pay for live channels that include content of which the viewer is only interested in a portion.

Thus, it would be desirable to provide a live channel wherein the content is tailored to an individual user such that users subscribe to the live channel. It would also be desirable to provide the additional live channel without requiring the additional expense of an additional content provider and encoder dedicated for the new channel.

BRIEF DESCRIPTION

The subject matter disclosed herein describes an apparatus and method for providing a virtual online linear video channel. The virtual online linear video channel is generated without requiring a dedicated content provider and encoder for the channel. A schedule server stores a schedule for the virtual online linear video channel, and the schedule may include one or more of live streaming video content, stored video content, and advertising. A video player establishes communication with a manifest server and requests playback of the video channel. The manifest server generates a per-user manifest file corresponding to the schedule of the virtual online linear video channel and delivers the per-user manifest file to the video player. The video player may then retrieve the desired video content from the content delivery network to produce the virtual online linear video channel.

According to one embodiment of the disclosure, a method for playback of a virtual online linear video channel is disclosed. A schedule for the virtual online linear video channel is generated, where the virtual online linear video channel includes multiple video sources. Each of the video sources is selected to distribute a video stream for at least a portion of the schedule. A manifest file is generated with a manifest server. The manifest file corresponds to the schedule for the virtual online linear video channel and identifies the selected video source from which the video stream is distributed at each portion of the schedule. A request to play the virtual online linear video channel is received from a video player, and the manifest file is transmitted to the video player.

According to other aspects of the disclosure, the multiple video sources may be selected from a live video stream, a video library, and an ad server. The multiple video sources may include a first live video stream and a second live video stream, where each of the first and second live video streams is output from a separate encoder.

According to another aspect of the disclosure, a connection is established between the manifest server and the video player, and a session identifier identifies the connection. A per-user manifest file may be generated in the manifest server, where the per-user manifest file is generated as a function of the manifest file and the session identifier. One of the video sources may be an ad server. At least one advertisement may be selected from the ad server as a function of the session identifier and inserted in the schedule for the virtual online linear video channel.

According to still another aspect of the disclosure, generating the schedule for the virtual online linear video channel may include the operations of displaying on an interface a list of the plurality of video sources available for inclusion in the schedule, receiving an indication of at least two different video sources and a corresponding time for inclusion in the schedule, and storing the schedule in a channel scheduler. A provider of at least one of the plurality of video sources may enter the indication of the at least two different video sources and the corresponding time on the interface.

According to another embodiment of the disclosure, a system for providing a virtual online linear video channel is disclosed. The system includes a channel scheduler and a manifest server. The channel scheduler is operative to receive a plurality of selections from a user interface, generate a schedule for a video channel corresponding to the plurality of selections, and store the schedule for the video channel. Each selection from the user interface identifies a video source and a time for receiving the video source, and at least two video sources are selected. The manifest server is operative to receive a request to play the video channel from a video player, obtain the schedule for the video channel from the schedule server, generate a manifest file corresponding to the schedule, and deliver the manifest file to the video player.

According to yet other aspects of the disclosure, the manifest server is further operative to establish a connection with the video player, where a session identifier identifies the connection. A per-user manifest file may be generated as a function of the manifest file and the session identifier, and the per-user manifest file is delivered to the video player. The system may also include an ad server operative to store a plurality of advertisements, receive a selection of advertisements stored in the ad server as a function of the session identifier, and transmit the advertisement to an address for playback. The manifest server may insert the address of the advertisement in the manifest file for playback on the video player. Optionally, the channel scheduler may define multiple time slots for advertisements and the ad server selects each of the at least one advertisement for insertion in the time slot.

According to still other aspects of the disclosure, the system may include a packager in communication with the manifest server and an ad server. The packager is operative to read a playlist from the manifest file on the manifest server, identify an entry in the playlist corresponding to an ad time slot, and retrieve an advertisement stored in an ad server for playback during the identified ad time slot. The packager may also be operative to store the advertisement at an address, and the manifest server may also be operative to store the address in the entry in the playlist prior to the video player retrieving the advertisement from the address.

According to yet another embodiment of the disclosure, a method for playback of a virtual online linear video channel is disclosed. A video channel is selected for playback on a video player, and an indication of the selected video channel is transmitted to a manifest server from the video player. The video player receives a manifest file from the manifest server, where the manifest file is generated by the manifest server to correspond to a schedule of the selected video channel. The schedule for the video channel identifies multiple video sources and each of the video sources is distributed on the video channel for at least a portion of the schedule. The manifest file identifies one of the video sources from which a video stream will be provided to the video player for each portion of the schedule.

These and other objects, advantages, and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 3 is a segment of a manifest file describing the bandwidths of the available streams for the streaming video content and the location of each stream;

FIG. 4 is a segment of a manifest file including a portion of a playlist where the video content is encrypted;

In describing the preferred embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
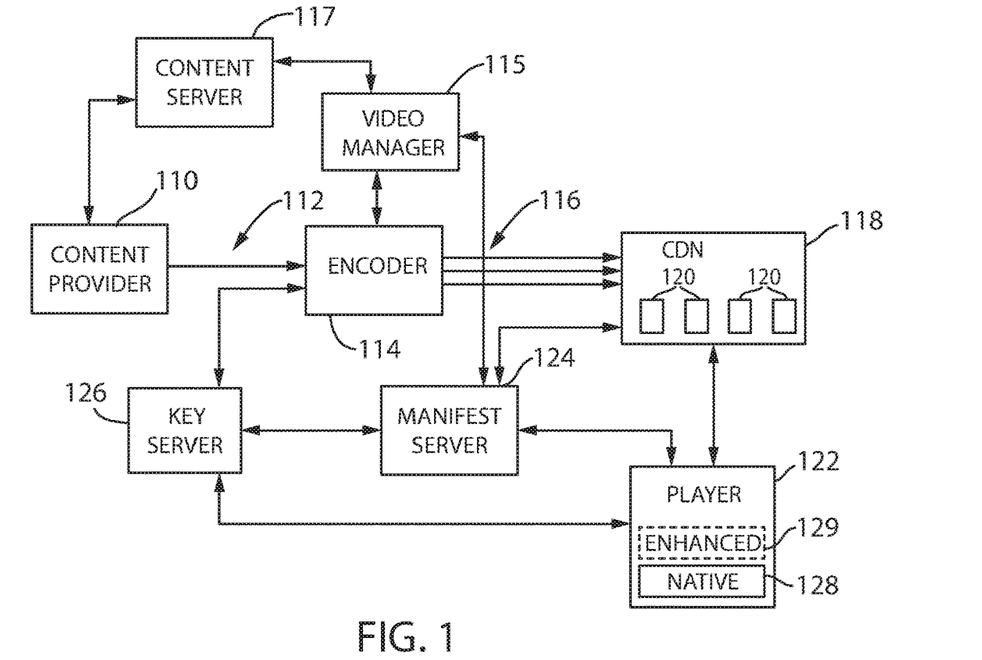
FIG. 1 is a block diagram representation of an environment for virtual online linear video channel generation and playback.

Turning initially to FIG. 1, one environment for virtual online linear video channel generation and playback is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 116 and stored on a CDN 118. It is noted that the "single" manifest file refers to a common or identical manifest file for each encoded signal. The manifest file may be comprised of multiple data files stored on the CDN where each data file contains information for a portion of the data required to playback the streaming signal. Further, for live streaming video, the manifest file may be updated and retransmitted at a periodic interval as new content is added from the live event. Although multiple files are used, the content of the manifest file generated by the encoder 114 for delivery to each video player 122 is the same. Each CDN 118 includes a number of edge servers 120 which store the encoded video signal 116 and manifest file until playback of the video content is requested by a video player 122. Although the embodiment illustrated in FIG. 1 shows a single CDN 118, it is contemplated that the encoded video signal 116 may be stored on multiple CDNs 118. The manifest file may include an address of each CDN such that playback may occur from any of the CDNs 118.

As further shown in FIG. 1, the illustrated environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the device 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, when a user 125 requests video content for playback on the video device 122, the native or enhanced video player module 129 communicates with a manifest server 124 rather than the CDN 118 to obtain the manifest files for video playback. The manifest server 124 manages the retrieval and delivery of the manifest file generated by the encoder 114 to provide the unique manifest file to each video player 122.

Figure 2:
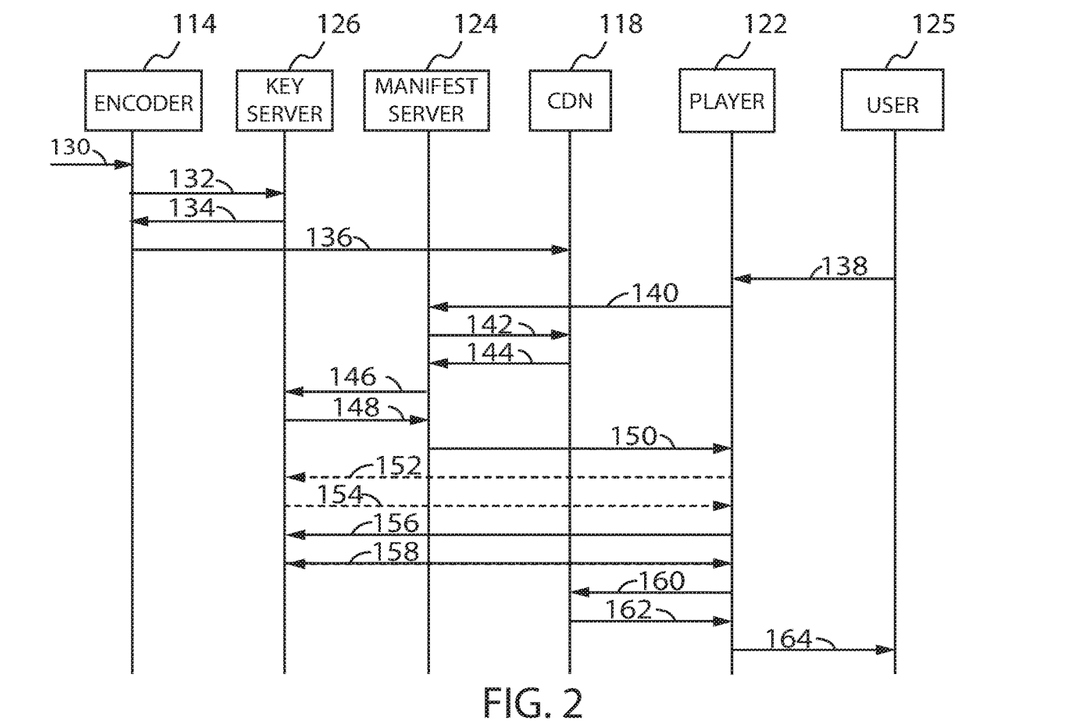
FIG. 2 is a flow diagram illustrating per-user video manifest generation and playback.

Turning next to FIG. 2, the operations performed to create, deliver, and playback video content according to a per-user manifest file are illustrated. At block 130, the encoder 114 receives the initial video signal 112. It is contemplated that this video signal 112 may be a pre-recorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 112 into segments, the encoder 114 encrypts the video signals 112 to prevent unauthorized viewing of the video content. At block 132, the encoder 114 establishes communication with a key server 126 and requests a key to use for encrypting the segmented video signal 112. The key server 126 returns a key to the encoder 114 as shown in block 134. The key used to encrypt the segmented video signal 112 will be referred to herein as the content encryption key. The encoder 114 may use any suitable encryption protocol, such as the Advanced Encryption Standard (AES), to encrypt the segmented video signal using the content encryption key. The location of the key server and the content encryption key used to encrypt the segmented video signal is included in a manifest file. The manifest file and the encrypted video signal are then transmitted to the CDN 118 for storage in one of the edge servers 120, as shown in block 136.

At block 138, a user 125 then requests playback of a desired video segment on the video player 122. The video player 122 may be any suitable electronic device to receive the streaming signal 116 such as a desktop computer, a television, a laptop computer, a tablet, Wi-Fi enabled device connected to a video screen, or a mobile phone. The video player 122 requests a manifest file from the manifest server 124 in order to retrieve the information necessary to play the requested video content. With reference also to FIGS. 3 and 4, segments of manifest files are illustrated that demonstrate a portion of the content that may be available in a manifest file. The manifest file is a text file and the particular content on each line of the text file is identified by the directive at the start of the line. The directive, for example, may identify specific streams in the streaming signal 116 where each stream has a different bandwidth. The location of a playlist for each of the streams is also included in the manifest file. Each line of a playlist may begin with the location of the key server to decrypt the video segment, identify a particular video segment of the desired video signal, and provide the location of the video segment in the CDN 118. The manifest file may include any information corresponding to the video stream, such as metadata information for the video stream.

When the video player 122 requests the manifest file from the manifest server 124 a connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. If the enhanced video player module 129 is present on the video player 122, the enhanced video player module 129 may provide an indication to the manifest server 124 of its presence, for example, via a unique data packet format or an identifier set in the header or payload of the request for a manifest file. The manifest server 124 then requests the manifest file from the CDN 118 at block 142. At block 144, the CDN 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. However, because the manifest server 124 is providing a unique manifest file to each player, the manifest file may include identifying information of the video player 122, the user 125 of the video player, or a combination thereof. Further, the manifest file may be modified to include content specific for the user 125. Consequently, it may be desirable to encrypt the manifest file prior to transmitting it to the video player 122.

The manifest server 124 may be configured to generate an encryption key for each manifest file. The encryption key is generated as a function of the unique session identifier generated by the video player 122 when it requested the desired video content. Optionally, the encryption key may also be generated as a function of the requested video content. As a result, each encryption key is unique to a specific session with a particular video player, resulting in a one-time use unique encryption key. The one-time use unique encryption key will be referred to herein as the manifest encryption key. At block 146, the manifest server 124 transmits the manifest encryption key to the key server 126, and at block 148, the key server 126 acknowledges receipt of the manifest encryption key.

Optionally, the key server 126 may be configured to generate the manifest encryption key. At block 146, the manifest server 124 transmits the session identifier and an identifier corresponding to the desired video content to the key server rather than transferring the manifest encryption key. The key server 126 may then generate the manifest encryption key and, at block 148, return the manifest encryption key to the manifest server 124. After generating or obtaining the manifest encryption key, the manifest server 124 encrypts the manifest file prior to transmitting the manifest file to the video player 122. The manifest server 124 then transmits the encrypted manifest file to the video player 122, as shown at block 150.

Optionally, if the manifest server 124 has received an indication of the presence of the enhanced video player module 129, the manifest file may be encrypted without inserting the location of an encryption key. The enhanced video player module 129 may be configured to generate a duplicate encryption key on the video player module as a function of the session identifier and, therefore, transmission of the key is not required. After retrieval and editing, if necessary, of the manifest file, the manifest server 124 encrypts the manifest file with the manifest encryption key prior to transmitting the manifest file to the video player 122. The manifest server 124 then transmits the encrypted manifest file to the video player 122, as shown at block 150.

If, however, the video player does not include an enhanced video player module 129 from the provider of the manifest server 124, the manifest server 124 may include a path to the key server 126, similar to that shown in FIG. 4, and the video player 122 requests the manifest encryption key from the key server 126 as shown in block 152. At block 154, the key server 126 returns the manifest encryption key to the video player 122, and the video player 122 decrypts the manifest file.

In some embodiments, the manifest file may remain unencrypted. When the manifest file is to remain unencrypted, the manifest server 124 may still generate a unique manifest file for the session with the video player 122. The blocks in FIG. 2 process as discussed above from block 130 to block 144. However, rather than encoding the manifest file, the manifest server 124 skips blocks 146 and 148, transmitting an unencrypted manifest file to the video player at block 150. The video player 122 reads the manifest file and determines that the video content has been encrypted and, therefore, must still be decrypted.

Having decrypted the manifest file, either directly on the video player 122 with an enhanced video player module 129 or by requesting the manifest encryption key from the key server 126 and then utilizing the native video player module 128 to decode the manifest file, either the enhanced video player module 129 or the native video player module 128 next needs to decode the video content.

The video player module reads the location of the key server 126 for the content encryption key from the manifest file. It is contemplated that a single key server 126 may contain both the manifest encryption key and the content encryption key. Optionally, separate key servers 126 may be utilized for each of the encryption keys. The video player 122 requests the content encryption key from the key server 126 identified in the manifest file, as shown in block 156. At block 158, the key server 126 returns the content encryption key to the video player 122. The manifest file will have the address of the CDN 118 as containing the segmented video content. Therefore, the video player can then start retrieving the video content from the CDN. The video player 122 repeatedly requests the next segment in the playlist from the CDN 118 and the CDN returns the requested segment as shown by blocks 160 and 162. The native video player module 128 then decodes the content from the encrypted video segments and displays the requested video content to the user 125.

Figure 7:
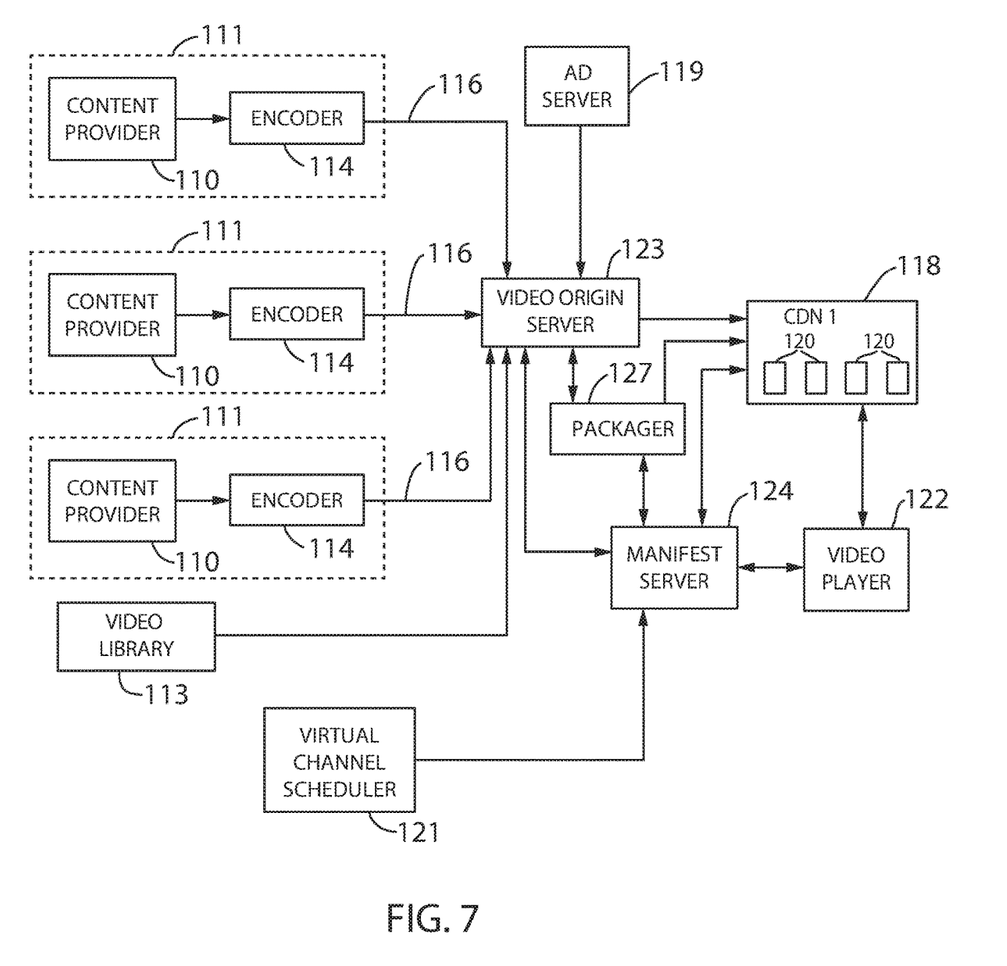
FIG. 7 is an environment operative to generate a virtual online linear video channel according to one embodiment of the disclosure.

Turning next to FIG. 7, a series of live streaming channels 111 are illustrated. Each of the live streaming channels includes a separate content provider 110 and encoder 114. It is contemplated that the content provider 110 may provide live events, such as a sporting event, a concert, or the like as well as prerecorded content, such as a television show or a movie. The content is, however, provided according to a predefined schedule for the live streaming channel. It is contemplated that each of the live streaming channels is owned by a single broadcast company. For example, the broadcast company may be NBC® and the live streaming channels may be a local NBC channel, MSNBC®, and NBC Sports®. Further, the broadcast company may own a video library 113 including, for example, movies, prior sporting events, earlier episodes of live programming, and the like. The video library 113 may be accessible via an on-demand service where viewers may select video content from the library 113 for viewing. In addition, an advertisement server 119 is provided on which advertisements may be stored for delivery to the CDN 118 and/or to the video player 122. For convenience, a video origin server 123 is shown. Each of the live streaming channels 111, the video library 113, and advertisements are available through the video origin server 123. The content of each may be stored on the CDN 118. Optionally, the streaming video signals 116, on-demand content, and advertisements may be provided separately to the content delivery network 118.

As previously discussed, the broadcast company presently creates a schedule and a playlist for the content delivered by each content provider 110 to generate a live streaming channel 111. The content provider 110 outputs the video signal to the encoder 114, which, in turn, outputs a segmented streaming video signal 116 suitable for delivery to and storage on the CDN 118. Presently, a viewer uses the video player 122 to access each live streaming channel 111 and watch the content presently being delivered on the channel.

The present disclosure allows the broadcast company to develop additional live streaming channels tailored to a viewer's interests without requiring an additional content provider 110 and encoder 114 for the channel. The additional live streaming channels are referred to herein as a virtual online linear video channel wherein the use of virtual indicates that the additional streaming channels do not require a content provider 110 and encoder 114 dedicated to each new channel. The use of linear indicates that the video channel transmits content according to a predefined schedule, where definition of the schedule is provided in more detail below. Transmitting content according to a predefined schedule is in contrast to on-demand content in which a user selects content from a playlist for playback at their desired time. The content on the virtual online linear channel will be available to all users at the same time and on a single channel similar to the other live streaming channels described above. Thus, the content on the virtual online linear video channel is streamed at a predefined time from one or more other live streams. Further, the broadcast company may develop premium virtual online linear video channels for which a viewer may pay an additional fee that omits all advertising.

Figure 8:
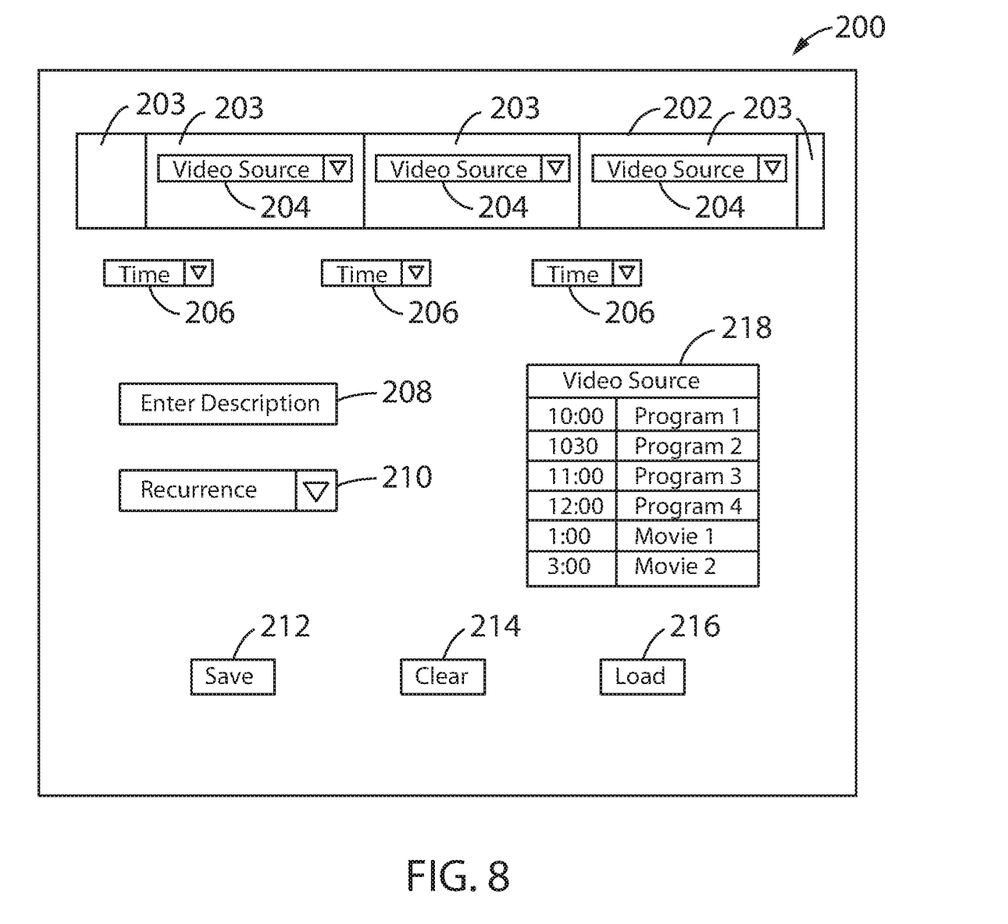
FIG. 8 is one embodiment of an interface for generating a schedule for the virtual online linear video channel.

A virtual channel scheduler 121 is provided that generates playlists for each of the virtual online linear video channels. According to one embodiment of the disclosure, the virtual channel scheduler 121 may be included on a server owned by the broadcast company. According to another embodiment of the disclosure, the virtual channel scheduler 121 may be provided on the cloud as a demand-based device, provided by either the broadcast company or a third party. The virtual channel scheduler 121 stores schedules of content for delivery. With reference also to FIG. 8, the virtual channel scheduler 121 provides an interface 200 for selecting video sources to be used in creating the virtual online linear video channel.

In the interface 200 illustrated in FIG. 8, a schedule bar 202 is presented with multiple slots 203. In each slot 203, a video source drop down menu 204 is provided from which a source of video content may be selected. Further the start/stop time for each slot 203 may similarly be selected via a time drop down menu 206. A title for the channel may be entered in the description 208 text box, and a recurrence of the channel may be selected via a recurrence drop down menu 210. For example, the schedule may be implemented once or may repeat, for example, on a daily or weekly basis. A preview window 218 may provide an existing schedule for each live video channel 111 to assist a user in selecting start/stop times and/or content for inclusion in the schedule for the virtual online channel. Once the schedule has been defined, a save button 212 allows the selected schedule to be stored in the virtual channel scheduler 121. Buttons 214, 216 are also provided to clear the schedule or to load an existing schedule. The interface 200 is described herein according to one embodiment. It is contemplated that various other arrangements of the interface 200 may be utilized without deviating from the claimed disclosure. The interface 200 may include various configurations of windows, text boxes, drop-down menus, buttons and the like as would be understood in the art to provide a user the ability to select video sources for inclusion in the virtual online video channel.

Figure 5:
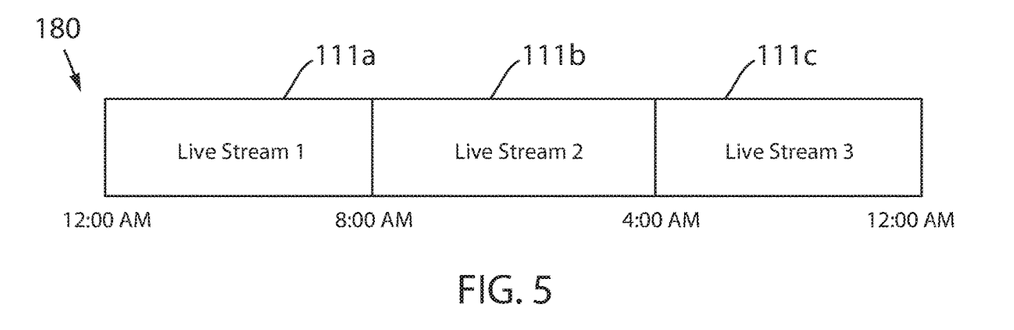
FIG. 5 is a schedule of multiple live streaming video channels arranged to generate a virtual online linear video channel according to one embodiment of the disclosure.
Figure 6:
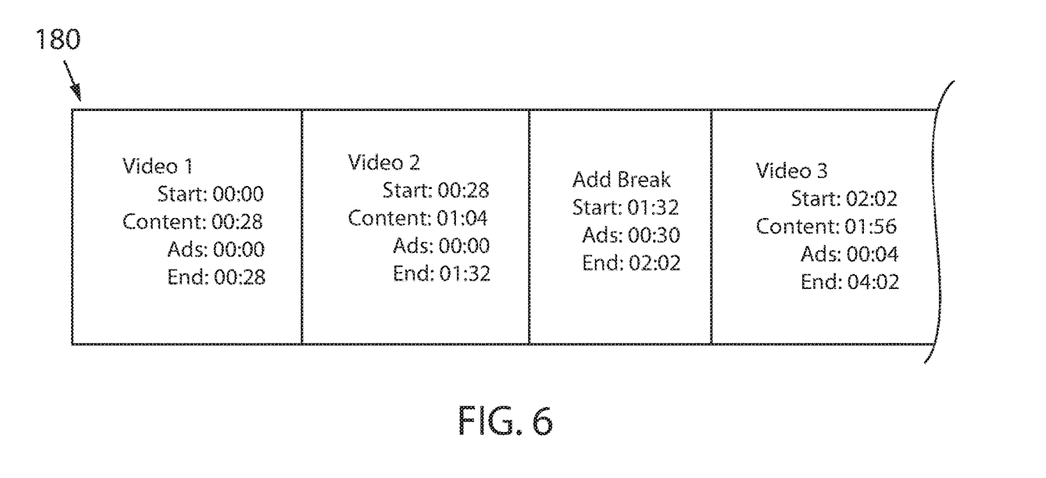
FIG. 6 is a schedule of stored video content arranged to generate a virtual online linear video channel according to one embodiment of the disclosure.

With reference, for example, to FIG. 5, a schedule 180 for a virtual online linear video channel may be created that includes video content from a first live stream channel 111a provided between midnight and eight o'clock in the morning, a second live stream channel 111b provided between eight o'clock in the morning and four o'clock in the afternoon, and a third live stream channel 111c provided between four o'clock in the afternoon and midnight. The schedule may repeat on a daily basis or may be uniquely defined for the next day. With reference also to FIG. 6, a schedule 180 for content from the video library 113 is illustrated. The schedule 180 includes a first video and a second video played back-to-back with no advertisements. Then a thirty minute advertisement, sometimes referred to as an infomercial, is shown. A third video follows that includes four minutes of advertising content delivered at the start, the end, or interspersed throughout the video content. The schedule 180 of content from the video library 113 may continue in a similar manner throughout the day.

Creation of the schedule may be performed by the broadcast company, by a third party, or even by a viewer. The virtual channel scheduler 121 may provide the interface 200 through which content may be scheduled for the virtual online video channel. The content may be selected from multiple video sources such as live video streams 111, the video library 113, or the ad server 119, and it is contemplated that the schedule will include at least two video sources, where the video sources may be, for example, different live video streams 111 or a live video stream 111 and the video library 113. The interface 200 may provide, for example, a list of content and a template schedule where the content may be dragged and dropped into the schedule.

The schedule may be created either by a broadcast company or by individual viewers. If the broadcast company is generating a schedule, the schedule may be determined based on market research, geographic location, and the like and is typically fixed over a period of time. If a third party or individual viewers are generating a schedule, the broadcast company may offer variable levels of flexibility according to a pricing schedule. At a top pricing tier, the third party or individual viewer may select any live stream channel or content from the video library for delivery according to their desired schedule. At one or more lower pricing tiers, the broadcast company may require a certain percentage of content be selected from the advertising server 119 according to the pricing tier. The broadcast company may, however, allow the user to identify, for example, a product category or company list from which advertisements will be played. Optionally, the broadcast company may restrict the video sources available for inclusion in the schedule based on the pricing tier as well. At a bottom tier, the broadcast company may select and insert advertisements into the schedule template and/or only allow users to select a portion of the live streaming videos 111 or video library 113 for insertion into the schedule for their virtual online video channel. Each of the schedules is stored on the virtual channel scheduler 121.

To access the virtual online linear video channel, a viewer requests the channel using the native video module 128 or enhanced video module 129 on the video player 122 in the same manner as requesting a live streaming channel 111. Optionally, the online video channel may be restricted to a subscription service or to an individual viewer if it is a custom video channel. The viewer may be required to enter user identification to access the video channel. The enhanced video module 129 may be operative to receive and verify the credential information, provide the virtual online channel as an option in a playlist to the viewer, and transmit the selection of the virtual online channel and any credential information to the manifest server 124 to permit access to the virtual online channel.

The per-user manifest system discussed above is utilized to deliver the content of the virtual online linear channel to the viewer. As previously discussed, each of the live stream channels 111 generate video files and manifest files to be stored on the CDN 118 where a video player 122 may access the CDN 118 directly or via the manifest server 124 to retrieve the content for the live stream channel 111. If the online video channel includes a portion of the content of the live stream channel 111, the manifest server 124 inserts into a per-user manifest file the location on the CDN 118 at which the live stream content is stored. If the schedule indicates that advertisements are to be included, the manifest server 124 retrieves ad content from the ad server 119 and stores it on the CDN 118. The manifest server 124 also includes the location of the ad content on the CDN 118 in the manifest file such that the video player 122 may retrieve and play back the ad content. The packager 127 may work in combination with the manifest server 124 to retrieve ad content from the ad server 119 and store it in the CDN 118. The packager 127 allows for just in time delivery of content by reading the per-user manifest file from the manifest server 124. The packager 127 identifies entries in the playlist of the manifest file that correspond to an advertisement. The packager 127 retrieves content from an ad server 119 as required by the play list. The packager 127 may transfer the ad content from the ad server 119 to the CDN 118 as it is needed for playback on the video player 122. Optionally, the packager 127 may transfer the ad content from the ad server 119 to the manifest server 124 or to the packager 127 for subsequent delivery to the video player 122. The video player 122 retrieves the ad content from the address in the playlist of the manifest file. It is contemplated that the packager 127 alone or in combination with the manifest server 124 may edit the per user manifest file to identify the address at which the as content is stored for subsequent playback on the video player 122.

Similarly, the manifest server 124 and/or the packager 127 may deliver video content from the video library 113 on demand as it is required to fill a time slot in the schedule 180. It is contemplated that the packager 127 and the manifest server 124 may be implemented separately or together on a local server or on a cloud server providing scalability of service as required. By generating a per-user manifest file that includes a playlist as defined by the schedule for the virtual video channel, the content desired by the viewer may be provided in a continuous manner appearing to the viewer to be a live streaming channel.

Portions of the disclosed embodiment are described herein as being implemented on various physical devices, including, but not limited to the video player 122, the manifest server 124, the key server 126, the encoder 114, the edge server 120 within a CDN 118, the content server 117, the video manager 115, the video origin server 123, the packer 127, the ad server 119, and the virtual channel scheduler 121. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the technology disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A method for playback of a virtual online linear video channel, comprising:

in response to establishing a connection between a manifest server and a video player, requesting a manifest file from at least one content delivery network;

receiving the manifest file from the at least one content delivery network;

generating a per-user manifest file in the manifest server, wherein the per-user manifest file is generated based on the manifest file and a session identifier generated by the manifest server, wherein the session identifier identifies the connection between the manifest server and the video player;

providing, by the manifest server, the per-user manifest file based on the received manifest file, the per-user manifest file corresponding to a schedule for the virtual online linear video channel, wherein the virtual online linear video channel includes a plurality of video sources and each of the plurality of video sources is selected to distribute a video stream for at least a portion of the schedule, wherein the per-user manifest file identifies the selected video source from which the video stream is distributed at each portion of the schedule, wherein the per-user manifest file identifies a first location of a first playlist for a first live video stream of the plurality of video sources and a second location of a second playlist for a second live video stream of the plurality of video resources, wherein the first live video stream is provided by a first live stream channel, and wherein the second live video stream is provided by a second live stream channel; and in response to receiving a request to play the virtual online linear video channel from a video player:

generating an encryption key based on the session identifier;

encrypting the per-user manifest file using the encryption key prior to transmitting the per-user manifest file to the video player; and transmitting the per-user manifest file to the video player, the per-user manifest file identifying the plurality of video sources that provide a plurality of video streams to be retrieved by the video player, the retrieved video streams are to be decoded by the video player to produce the virtual online linear video channel, which is then presented to a user of the video player.

2. The method of claim 1 wherein the plurality of video sources are selected from at least one of a live video stream, a video library, and an ad server.

3. The method of claim 2, wherein each of the first and second live video streams is output from a separate encoder.

4. The method of claim 1, wherein generating the per-user manifest file further comprises:
selecting at least one advertisement from a plurality of advertisements based on the session identifier; and
inserting an address of the at least one advertisement in the manifest file.

5. The method of claim 1 further comprising:
generating the schedule for the cirtual online video channel, wherein the generating comprises:
displaying on an interface a list of the plurality of video sources available for inclusion in the schedule;
receiving an indication of at least two different video sources and a corresponding time for inclusion in the schedule; and
storing the schedule in a channel scheduler.

6. The method of claim 5 wherein a provider of at least one of the plurality of video sources enters the indication of the at least two different video sources and the corresponding time on the interface.

7. A system for providing a virtual online linear video channel, comprising:
a channel scheduler operative to:
receive a plurality of selections from a user interface, wherein each selection identifies a video source and a time for receiving the video source and wherein the plurality of selections identify at least two video sources,
generate a schedule for a video channel corresponding to the plurality of selections, and
store the schedule for the virtual online linear video channel; and a manifest server, operative to:
receive a request to play the virtual online linear video channel from a video player,
obtain the schedule for the virtual online linear video channel from the channel scheduler,
in response to establishing a connection between the manifest server and the video player, request a manifest file from at least one content delivery network;
receive the manifest file from the at least one content delivery network;
provide, based on the received manifest file, a per-user manifest file corresponding to the schedule, wherein the per-user manifest file identifies a first location of a first playlist for a first live video stream of the at least two video sources and a second location of a second playlist for a second live video stream of the at least two video resources, wherein the first live video stream is provided by a first live stream channel, wherein the second live video stream is provided by a second live stream channel, wherein the per-user manifest file is generated based on the manifest file and a session identifier generated by the manifest server, and wherein the session identifier identifies the connection between the manifest server and the video player;
generate an encryption key based on the session identifier;
encrypt the per-user manifest file using the encryption key prior to delivering the per-user manifest file to the video player; and
deliver the per-user manifest file to the video player, the per-user manifest file identifying the plurality of video sources that provide a plurality of video streams to be retrieved by the video player, the retrieved video streams are to be decoded by the video player to produce the virtual online linear video channel, which is then presented to a user of the video player.

8. The system of claim 7 wherein each video source is selected from at least one of a live video stream, a video library, and an ad server.

9. The system of claim 8, wherein each of the first and second live video streams is output from a separate encoder.

10. The system of claim 7 further comprising an ad server operative to:
store a plurality of advertisements;
receive a selection of at least one advertisement stored in the ad server based on the session identifier, and
transmit the at least one advertisement to an address for playback, wherein the manifest server is further operative to insert the address of the at least one advertisement in the manifest file for playback on the video player.

11. The system of claim 10 wherein the channel scheduler defines a plurality of time slots for advertisements and the ad server selects each of the at least one advertisement for insertion in at least one of the time slots.

12. The system of claim 7 further comprising a packager in communication with the manifest server and an ad server, the packager operative to: read the first playlist from the manifest file on the manifest server; identify an entry in the first playlist corresponding to an ad time slot; and retrieve an advertisement stored in the ad server for playback during the ad time slot.

13. The system of claim 12 wherein the packager is further operative to store the advertisement at an address and the manifest server is further operative to store the address in the entry in the first playlist prior to the video player retrieving the advertisement from the address.

14. The system of claim 7 wherein the channel scheduler includes an interface operative to:
display a list of each video source available for inclusion in the schedule; and
receive an indication of the at least two video sources and a corresponding time for inclusion in the schedule.

15. A method for playback of a virtual online linear video channel, comprising:
selecting a video channel for playback on a video player;
transmitting an indication of the selected video channel to a manifest server from the video player; and
receiving at the video player a per-user manifest file from the manifest server,
wherein:
the per-user manifest file is generated by the manifest server based on a manifest file received from at least one content delivery network to correspond to a schedule of the selected video channel,
the manifest file is received by the manifest server in response to establishing a connection between the manifest server and the video player,
the schedule for the video channel identifies a plurality of video sources and each of the plurality of video sources is distributed on the video channel for at least a portion of the schedule, the per-user manifest file identifies one of the plurality of video sources from which a video stream will be provided to the video player for each portion of the schedule, the per-user manifest file identifies a first location of a first playlist for a first live video stream of the plurality of video sources and a second location of a second playlist for a second live video stream of the plurality of video resources, wherein the first live video stream is provided by a first live stream channel, wherein the second live video stream is provided by a second live stream channel, wherein the per-user manifest file is generated based on the manifest file and a session identifier generated by the manifest server, and wherein the session identifier identifies the connection between the manifest server and the video player, the per-user manifest file is encrypted using an encryption key, the encryption key generated based on the session identifier, and the per-user manifest file identifies the plurality of video sources that provide a plurality of video streams to be retrieved by the video player, the retrieved video streams are to be decoded by the video player to produce the virtual online linear video channel, which is then presented to a user of the video player.

16. The method of claim 15 further comprising entering an indication of each video source and a corresponding time for inclusion in the schedule using an interface executing on a channel scheduler.

17. The method of claim 16 further comprising inserting at least one ad time slot in the schedule for displaying an advertisement.

18. The method of claim 17 further comprising:
establishing the connection between the video player and the manifest server;
generating the session identifier corresponding to the connection; and
selecting an advertisement from an ad server for playback in the ad time slot based on the session identifier.

* * * * *

UNITED STATES PATENT AND TRADEMARK OFFICE
CERTIFICATE OF CORRECTION

PATENT NO.        : 10,595,054 B2
APPLICATION NO.   : 15/590996
DATED             : March 17, 2020
INVENTOR(S)       : Alper Turgut, Oztan Harmanci and Ismail Haritaoglu Page 1 of 1

It is certified that error appears in the above-identified patent and that said Letters Patent is hereby corrected as shown below:

In the Claims

In Claim 1, Column 12, Line 54, delete "resources" and insert --sources--

In Claim 5, Column 13, Line 19, delete "cirtual" and insert --virtual--

In Claim 7, Column 13, Line 59, delete "resources" and insert --sources--

In Claim 15, Column 15, Line 11, delete "resources" and insert --sources--

Signed and Sealed this
Fourth Day of August, 2020

Andrei Iancu
*Director of the United States Patent and Trademark Office*